United States Patent
Basant et al.

(10) Patent No.: US 10,885,055 B2
(45) Date of Patent: Jan. 5, 2021

(54) AUTOMATED DATA ENRICHMENT AND SIGNAL DETECTION FOR EXPLORING DATASET VALUES

(71) Applicant: FAIR ISAAC CORPORATION, Roseville, MN (US)

(72) Inventors: Nitin Basant, Ramgarh Cantt (IN); Paulo Mei, São Paulo (BR); Mary Krone, San Rafael, CA (US); Laura Waterbury, San Francisco, CA (US); Shubham Kedia, Giridih (IN); Ana Paula Azevedo Travassos, Sao Paulo (BR); Mayumi Assato, Americana (BR); Ryan Weber, Golden, CO (US)

(73) Assignee: Fair Isaac Corporation, Rosedale, MN (US)

(*) Notice: Subject to any disclaimer, the term of this patent is extended or adjusted under 35 U.S.C. 154(b) by 188 days.

(21) Appl. No.: 16/137,230

(22) Filed: Sep. 20, 2018

(65) Prior Publication Data

US 2020/0097591 A1    Mar. 26, 2020

(51) Int. Cl.
  *G06F 7/00* (2006.01)
  *G06F 16/25* (2019.01)
  *G06F 16/215* (2019.01)

(52) U.S. Cl.
  CPC .......... *G06F 16/258* (2019.01); *G06F 16/215* (2019.01)

(58) Field of Classification Search
  CPC .............................. G06F 16/258; G06F 16/215
  USPC ................................................... 707/600–899
  See application file for complete search history.

(56) References Cited

U.S. PATENT DOCUMENTS 10,545,975 B1 *  1/2020  Mahdy .................... G06F 16/25
2020/0097881 A1   3/2020  Krone et al.

* cited by examiner

*Primary Examiner* — Isaac M Woo
(74) *Attorney, Agent, or Firm* — Mintz, Levin, Cohn, Ferris, Glovsky and Popeo, P.C; Michael Van Loy; Paul Brockland

(57) ABSTRACT

One or more datasets are received by a data wrangling module and wrangled into a form that is computationally actionable by a user. At least some data from the one or more datasets are enriched by one or more data enrichment modules to generate an enriched form of at least some data corresponding to the one or more datasets that is computationally actionable by the user. The one or more datasets and the enriched form of the at least some data are processed by a signal detection module to identify relationships, anomalies, and/or patterns within the one or more datasets.

15 Claims, 2 Drawing Sheets

AUTOMATED DATA ENRICHMENT AND SIGNAL DETECTION FOR EXPLORING DATASET VALUES

TECHNICAL FIELD

The subject matter described herein relates to techniques for automated data enrichment and signal detection which can be used to efficiently evaluate almost any type of dataset generated by any industry.

BACKGROUND

According to various estimates, 2.5 quintillion bytes of data are created every day. For instance, in every minute of every day, Apple® users download more than 51,000 apps, Netflix® subscribers stream more than 77,000 hours of video, Twitter® users send more than 350,000 tweets, and Facebook® users "like" more than 4 million posts. Each of these actions by users generates data. The data can be transactional data, i.e. data with a timestamp which has been generated as the result of a transaction conducted by the user, or otherwise generated by activity, outside of any formal transaction.

Even with all of the advancements in big data technologies, it can often be very difficult to understand and evaluate, let alone use, this data. Traditional data evaluation methodologies often rely on a complete understanding of the data being evaluated as well as a specific objective for the evaluation. What is needed is a system and method for evaluating datasets across multiple objectives covering the breadth of a business with limited understanding of the data being evaluated, to provide data-based evidence to the business which informs the creation of various types of actionable analytics.

SUMMARY

Systems and methods are presented herein, which allow for evaluation of datasets across multiple objectives covering the breadth of a business as well as with limited understanding of the data being evaluated. These systems and methods provide data-based evidence to the business which enables the creation of various types of analytics, much of which can be actionable.

In one aspect, a system for exploring value of one or more datasets from one or more data sources is provided. The system includes a data wrangling module connected with the one or more data sources to receive the one or more datasets. The data wrangling module is configured to wrangle the one or more datasets into a form that is computationally actionable by a user. The system further includes one or more data enrichment modules connected with the data wrangling module and/or at least one of the one or more data sources. Each of the one or more data enrichment modules is configured to enrich at least some data from the one or more datasets to generate an enriched form of at least some data corresponding to the one or more datasets that is computationally actionable by the user. The system further includes a signal detection module connected with the data wrangling module, the data enrichment module, and/or the one or more data sources. The signal detection module is configured to process the one or more datasets and the enriched form of at least some data, to identify relationships, anomalies, and/or patterns within the one or more datasets.

In other aspects, a method of exploring value of one or more datasets from one or more data sources is provided. The method includes receiving, by a data wrangling module connected with the one or more data sources, the one or more datasets, the receiving being configured to wrangle the one or more datasets into a form that is computationally actionable by a user. The method further includes enriching, by one or more data enrichment modules connected with the data wrangling module and/or at least one of the one or more data sources, at least some data from the one or more datasets to generate an enriched form of at least some data corresponding to the one or more datasets that is computationally actionable by the user. The method further includes processing, by a signal detection module connected with the data wrangling module, the data enrichment module, and/or the one or more data sources, the signal detection module being configured to process the one or more datasets and the enriched form of at least some data, to identify relationships, anomalies, and/or patterns within the one or more datasets.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

This document describes systems and methods which allows for evaluation of datasets for multiple objectives covering a breadth of businesses as well as with limited understanding of the data being evaluated. In some implementations, the systems and methods provide data-based evidence to the business which informs the creation of various types of actionable analytics.

The systems and methods described herein utilize technology that is configured for receiving and consuming different types of data, potentially from multiple and usually different sources, wrangling the data, enriching the data and then automatically detecting signals of potential interest. The data wrangling, enrichment and the signal detection algorithms are each flexible, to allow for a user to define the configurations of each. This configuration is done through a user interface, such as, for example, a pre-configured application in FICO® Xpress Insight® to allow easy access to the platform as well as visual interactions with the data.

Figure 1:
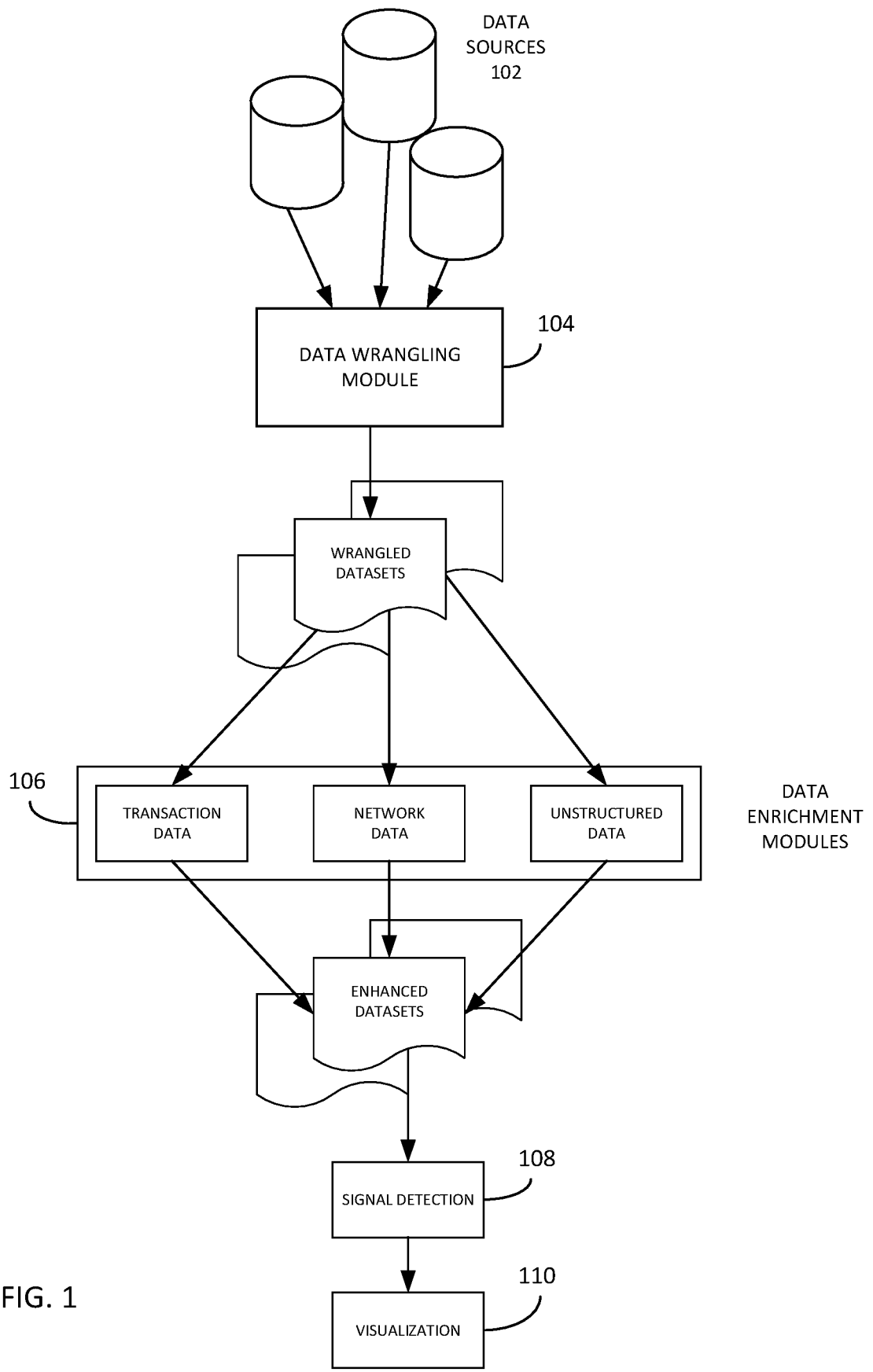
FIG. 1 shows a diagram illustrating aspects of a system showing features consistent with implementations of the current subject matter.

FIG. 1 illustrates a system 100 for exploring value of one or more datasets from one or more data sources 102. The system includes a data wrangling module 104 connected with the one or more data sources 102 to receive the one or more datasets, the data wrangling module being configured to wrangle the one or more datasets into a form that is computationally actionable by a user;

The data wrangling module 104 includes a number of sub-modules or sub-processes configured for cleaning the data, joining and/or merging different datasets, aggregating the data at desired or user-configurable levels, and combining and/or splitting fields of the data appropriately, etc. All of this is done in a visual manner, such as, for example, through the data wrangler 104 in the FICO® Analytics WorkBench®, to make it easy for the user to interact with the data and manipulate it as necessary. The system 100 can have a separate data wrangling module 104 as part of the platform, or can integrate with an external data wrangling tool.

The system 100 includes one or more data enrichment modules 106 connected with the data wrangling module 104 and/or at least one of the one or more data sources 102. Each of the one or more data enrichment modules 106 are configured to enrich at least some data from the one or more datasets to generate an enriched form of at least some data corresponding to the one or more datasets that is computationally actionable by the user. Each data enrichment module 106 includes one or more sub-modules or sub-processes to enrich different types of data. Examples of different sub-modules for data enrichment include a transactional data enrichment sub-module, a network data enrichment sub-module, and an unstructured data enrichment sub-module.

The transaction data enrichment sub-module enables creation of a large number of characteristics through comprehensive pre-defined templates. The transaction data enrichment sub-module allows users to configure events and metrics of interest on the transaction. It also allows users to select the different time intervals as well as templates which are relevant for the use case.

The network data enrichment sub-module enables detection of networks across datasets using the data available. These networks, depending on the data available, could be as simple as connecting individuals that share a phone number/email or individuals who transact with each other, or can be complex such as connecting medical providers who share more than a certain number of patients. The network data enrichment sub-module, through a user interface, allows users to configure networks by specifying linking fields and attributes as well other network features such as link strengths, etc. Once the networks have been detected, characteristics that summarize the information contained within these networks can be configured and generated in the module to enrich the original data.

The unstructured data enrichment sub-module can handle different types of unstructured data. For example, an unstructured text data module can help find keywords and concepts of relevance across unstructured text, and then generate characteristics based on those to enrich the one or more data sources 102. These characteristics can include, without limitation, a frequency of the keywords, a rate of the appearance of the keywords, etc.

In various implementations, a system 100 can include one or more of the several different data enrichment modules 106 described above, to handle still further different data types, such as a dataset related to a time series, audio data, etc. Furthermore, a system 100 can include data enrichment modules 106 that are associated with specific types of enrichment techniques, such as a time series, or libraries, such as a credit card fraud characteristic library, as examples.

The different data enrichment modules 106 of the system can run in parallel, generating independent datasets. Alternatively, an enriched dataset from one of the data enrichment modules (or sub-modules) can be used as an input to one or more other data enrichment modules 106. For example, output from the transaction data enrichment sub-module can be used within the network data enrichment sub-module to aggregate the transaction-based characteristics across the network, or an audio-oriented data enrichment module may be configured to transcribe audio data to text, and then leverage the unstructured text data enrichment module for characteristics generation.

The enriched dataset is then processed for signal detection by a signal detection module 108 of the system 100. The signal detection module 108 runs calculations that are optimized for a particular purpose to identify any of relationships, anomalies, monotonic and/or non-monotonic patterns within characteristics (or combinations thereof) against each of the multiple objectives. In some exemplary implementations, a base signal detection formula that allows for detection of different types of signals with minimal or no tweaks can be expressed generally as:

$$\text{strength of relationship} = \log\left\{\frac{P(x_m, y_n)}{P(x_m) * P(y_n)}\right\}$$

The above formula identifies relationships when values are sorted in decreasing order, but identifies outliers when values are sorted in increasing order. In addition, positive values signify a characteristic value occurring more frequently than random with an objective value, whereas negative values identify characteristic values that occur rarely with an objective value as compared to random.

A simple curve fitting over the strength also identifies monotonic and non-monotonic patterns in the data. In addition, different metrics over the different characteristics and objective values also inform the signal detection process. In an exemplary implementation, a curve fitting over simple average of the characteristics for each objective value can also be used to identify patterns within the data.

The system 100 further includes a user interface which includes a visualization layer 110 configured for analyzing different types of signals detected. The visualization layer 110 creates the graphs and visual graphics, which enables users to observe the signals in one or more of multiple views, i.e. through tables, graphs, and/or maps for geography-based characteristics, etc. It allows users to interact with the signals through multiple functionalities such as filters, sorting options, drill downs, etc.

The modular design of the system allows it to be flexible and the different modules can be used at different points of the process as necessary. For example, in some scenarios it may be useful to do some part of the enrichment before data wrangling.

The system 100 preferably leverages a big data platform that facilitates working with large datasets in keeping with current requirements. For example, the underlying raw data can be stored in a distributed file system and the calculations done via parallel processing. However, the innovative design with the different modules kept loosely integrated with each other, as separate applications, still capable of communicating with one another, within the same software platform, will allow the incorporation of the latest technologies quickly as individual modules can be swapped out for whatever is the best in class, which can mean open source, commercially available, or custom-built. Data can be consumed and outputted independently at any module, and hence the users can choose to use the full platform or individual modules while performing the other tasks in external tools.

Figure 2:
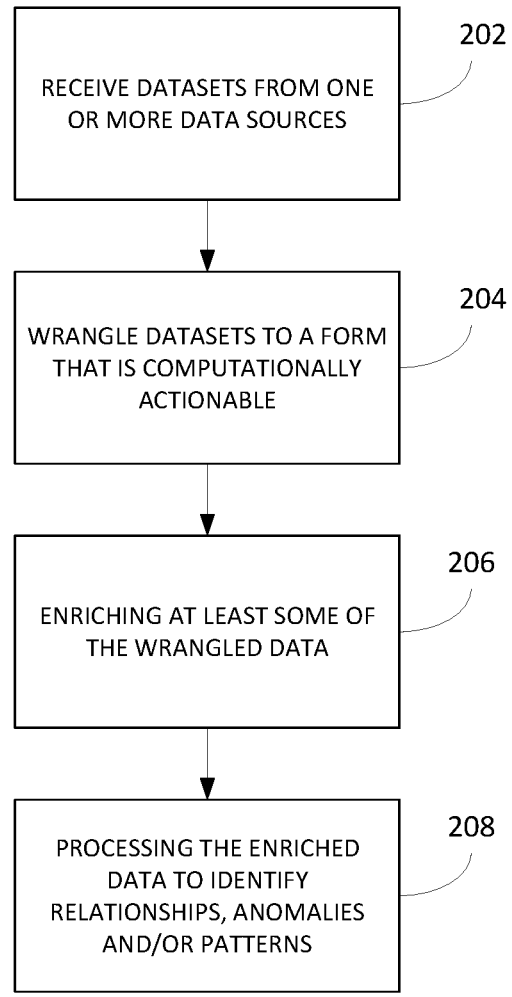
FIG. 2 shows a process flow diagram illustrating aspects of a method having one or more features consistent with implementations of the current subject matter; and When practical, similar reference numbers denote similar structures, features, or elements.

FIG. 2 is a flowchart of a method 200 of exploring value of one or more datasets from one or more data sources. At 202, a data wrangling module connected with the one or more data sources receives the one or more datasets. At 204, the data wrangling module is configured to wrangle the one or more datasets into a form that is computationally actionable by a user. At 206, one or more data enrichment modules connected with the data wrangling module and/or at least one of the one or more data sources enriches at least some data from the one or more datasets to generate an enriched form of at least some data corresponding to the one or more datasets that is computationally actionable by the user. At 208, a signal detection module connected with the data wrangling module, the data enrichment module, and/or the one or more data sources processes the one or more datasets and the enriched form of at least some data, to identify relationships, anomalies, and/or patterns within the one or more datasets.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system for exploring value of one or more datasets from one or more data sources, the system comprising:
   a data wrangling module connected with the one or more data sources and configured to receive the one or more datasets, the data wrangling module being configured to wrangle the one or more datasets into a form that is computationally actionable by a user;
   one or more data enrichment modules connected with the data wrangling module and/or at least one of the one or more data sources, the one or more data enrichment modules being configured to enrich at least some data from the one or more datasets to generate an enriched form of at least some data corresponding to the one or more datasets that is computationally actionable by the user, the one or more data enrichment modules including:
      a transaction data enrichment module configured to enable creation of characteristics through pre-defined templates,
      a network data enrichment module configured to detect a network across the one or more datasets, and
      an unstructured data enrichment module configured to handle different types of unstructured data; and
   a signal detection module connected with the data wrangling module, the data enrichment module, and/or the one or more data sources, the signal detection module being configured to process the one or more datasets and the enriched form of at least some data, to identify relationships, anomalies, and/or patterns within the one or more datasets.

2. The system in accordance with claim 1, further comprising a visualization module configured to generate, responsive to a signal from the signal detection module, a graphical representation of the processed one or more datasets, the enriched form of at least some data and the signals generated by the signal detection module.

3. The system in accordance with claim 1, wherein the one of the one or more data enrichment modules is configured to enrich transaction data from the datasets in the form that is computationally actionable by the user.

4. The system in accordance with claim 1, wherein the one of the one or more data enrichment modules is configured to enrich network data from the datasets in the form that is computationally actionable by the user.

5. The system in accordance with claim 1, wherein the one of the one or more data enrichment modules is configured to enrich unstructured data from the datasets in the form that is computationally actionable by the user.

6. A system for exploring value of one or more datasets, the system comprising:
   an input interface connected with one or more data sources, each of the one or more data sources providing at least one of transaction data, network data, and/or unstructured data;
   a data wrangling module connected with the input interface and configured to receive the one or more datasets, the data wrangling module being configured to wrangle the one or more datasets into a form that is computationally actionable by a user;
   one or more data enrichment modules connected with the data wrangling module and/or at least one of the one or more data sources, the one or more data enrichment modules being configured to enrich at least some data from the one or more datasets to generate an enriched form of at least some data corresponding to the one or more datasets that is computationally actionable by the user, the one or more data enrichment modules including:
      a transaction data enrichment module configured to enable creation of characteristics through pre-defined templates,
      a network data enrichment module configured to detect a network across the one or more datasets, and
      an unstructured data enrichment module configured to handle different types of unstructured data; and
   a signal detection module connected with the data wrangling module, the data enrichment module, and/or the one or more data sources, the signal detection module being configured to process the one or more datasets and the enriched form of at least some data, to identify relationships, anomalies, and/or patterns within the one or more datasets.

7. The system in accordance with claim 6, further comprising a visualization module configured to generate, responsive to a signal from the signal detection module, a graphical representation of the processed one or more datasets, the enriched form of at least some data and the signals generated by the signal detection module.

8. The system in accordance with claim 6, wherein the one of the one or more data enrichment modules is configured to enrich transaction data from the datasets in the form that is computationally actionable by the user.

9. The system in accordance with claim 6, wherein the one of the one or more data enrichment modules is configured to enrich network data from the datasets in the form that is computationally actionable by the user.

10. The system in accordance with claim 6, wherein the one of the one or more data enrichment modules is configured to enrich unstructured data from the datasets in the form that is computationally actionable by the user.

11. A method of exploring value of one or more datasets from one or more data sources, the method comprising:
   receiving, by a data wrangling module connected with the one or more data sources, the one or more datasets, the data wrangling module being configured to wrangle the one or more datasets into a form that is computationally actionable by a user;
   enriching, by one or more data enrichment modules connected with the data wrangling module and/or at least one of the one or more data sources, at least some data from the one or more datasets to generate an enriched form of at least some data corresponding to the one or more datasets that is computationally actionable by the user, the enriching comprising:
      creating, by a transaction data enrichment module, characteristics of one or more transactions through pre-defined templates,
      detecting, by a network data enrichment module, a network across the one or more datasets, and
      handling, by an unstructured data enrichment module, different types of unstructured data; and processing, by a signal detection module connected with the data wrangling module, the data enrichment module, and/or the one or more data sources, the one or more datasets and the enriched form of at least some data, to identify relationships, anomalies, and/or patterns within the one or more datasets.

12. The method in accordance with claim 11, further comprising a visualization module configured to generate, responsive to a signal from the signal detection module, a graphical representation of the processed one or more datasets, the enriched form of at least some data and the signals generated by the signal detection module.

13. The method in accordance with claim 11, wherein the one of the one or more data enrichment modules is configured to enrich transaction data from the datasets in the form that is computationally actionable by the user.

14. The method in accordance with claim 11, wherein the one of the one or more data enrichment modules is configured to enrich network data from the datasets in the form that is computationally actionable by the user.

15. The method in accordance with claim 11, wherein the one of the one or more data enrichment modules is configured to enrich unstructured data from the datasets in the form that is computationally actionable by the user.

* * * * *